United States Patent Office 3,171,856
Patented Mar. 2, 1965

3,171,856
ACID PURIFICATION PROCESS
Kerwin K. Kurtz, Orange, Conn., assignor, by mesne assignments, to Socony Mobil Oil Company, Inc., a corporation of New York
No Drawing. Filed Jan. 4, 1962, Ser. No. 164,401
3 Claims. (Cl. 260—525)

The present invention relates to a process for purifying aromatic carboxylic acids. More particularly, the present invention resides in a method for purifying aromatic carboxylic acids by crystallizing the crude acid from the reaction liquor in which it was originally formed.

In recent years, various aromatic carboxylic acids, such as, terephthalic acid, have attained considerable commercial importance. One reason for this commercial importance is the fact that these acids when purified are capable of entering into condensation polymerization reactions with various glycols to form compositions from which highly valuable films, fibers and filaments may be produced.

In order to achieve the more desirable properties it is necessary thatt he carboxylic acids be in a purified state. Due to the insolubility of most of the acids in common solvents, it has been difficult to effect purification of the acids by normal recrystallization procedures. For example, terephthalic acid usually contains appreciable amounts of p-toluic acid, terephthalaldehydic acid, residual catalyst and colored oxidation products which are exceedingly difficult to separate from the acid product. The similarity between p-toluic acid, terephthalaldehydic acid and terephthalic acid with respect to chemical and physical properties make it exceedingly difficult to separate terephthalic acid from these impurities by conventional methods. The chemical methods of purification of the aromatic carboxylic acids of the present invention which have been heretofore employed have not been entirely satisfactory due to the limited success thereof and due to economic factors.

Accordingly, therefore, it is a principal object of the present invention to provide a process for purifying aromatic carboxylic acids which overcomes the difficulties heretofore encountered and which simply, expeditiously and inexpensively produces a purified product.

In accordance with the present invention it has now been found that aromatic carboxylic acids may be purified by heating at a temperature of 225–260° C. and at least autogenous pressure for at least 10 minutes a crude aromatic carboxylic acid, said crude aromatic carboxylic acid comprising the oxidation product of a methyl aromatic compound, and crystallizing the purified acid by cooling the resulting solution below 170° C.

It has been found, surprisingly and unexpectedly, that the foregoing process overcomes the disadvantages of the art and enables the attainment of a purified product readily and inexpensively. The findings of the present invention are especially surprising in view of the fact that purification of a solid precipitated from a liquid cannot be usually effected by recrystallization from that same liquid.

The crude aromatic carboxylic acid starting material comprises the oxidation product of a methyl aromatic compound. This oxidation product may be obtained by conventional procedures. Normally, the crude aromatic carboxylic acid comprises the oxidation product of a dilute solution of a methyl aromatic compound in a lower fatty acid having 2–4 carbon atoms, said solution initially containing minor proportions of water, a methylenic ketone and a cobalt salt of a lower fatty acid containing 2–4 carbon atoms.

Oxidation of the foregoing dilute solution is usually effected by contacting the reaction mixture with a gas containing molecular oxygen at a partial pressure of oxygen amounting to from 100 to 1000 lbs. per square inch. The oxidation reaction is generally continued for a period of a few minutes to not more than about four hours until 30 to 95% of the methyl aromatic compounds is oxidized to carboxylic acid product.

While air or air enriched with molecular oxygen may be advantageously employed, gaseous oxygen of commercial purity is preferred. Best results in the oxidation process are obtained at reaction temperatures of about 130° C., although good results are obtained at reaction temperatures within the range of 120–145° C.

The methyl aromatic compound starting material for the oxidation process has one or more methyl groups substituted in the aromatic nucleus. Oxidation of the methyl aromatic compound results in the formation of aromatic carboxylic acid by conversion of methyl groups to carboxylic groups. Typical starting materials are methyl-substituted benzenes, such as toluene, m-xylene, p-xylene, or mixtures containing such compounds. The methyl aromatic compounds are preferably monocyclic, such as the methyl-substituted benzenes, but bicyclic compounds may also be employed, such as the methyl-substitued naphthalenes. The methyl aromatic starting material may contain, in addition to methyl, other nuclear substituents inert to the oxidation reaction, such as chlorine, bromine, fluorine, nitro, carboxyl, alkoxy, aryloxy, or tertiary alkyl groups. Typical conversions include toluene to benzoic acid, m-xyene or m-toluic acid to isophthalic acid, p-xylene or p-toluic acid to terephthalic acid, 1,4-dimethyl-2-chlorobenzene to chloroterephthalic acid, and 1,4-dimethyl-2-nitrobenzene to nitroterephthalic acid.

The methyl aromatic compound is provided in the form of a dilute-solution in a solvent consisting essentially of acetic, propionic, or butyric acid or a mixture containing at least two of said acids. While an inert diluent, such as benzene or chlorobenzene, may be added to the lower fatty acid solvent in minor proportions, such addition is generally not preferred. By dilute solution, reference is had to compositions wherein the methyl aromatic compound is present in an amount of 2 to 20%, preferably 8 to 16 percent by weight of the fatty acid solvent.

The requirement for effective catalysis by a soluble cobalt salt is met by the provision in the reaction mixture of cobalt acetate, propionate or butyrate or mixtures thereof in such amount as to correspond to 0.1 to 1 percent, preferably 0.3 to 0.6 percent by weight of cobalt metal based on the weight of the fatty acid solvent.

A further essential requirement is the presence as reaction activator of a methylenic ketone, such as methyl ethyl ketone, methyl n-propyl ketone, diethyl ketone, 2,4-pentanedione and 2,5-hexanedione, with methyl ethyl ketone being a preferred activator. The activator concentration should be at least about 1% and preferably in the range of 3 to 10% by weight of the fatty acid solvent. Higher concentrations may be advantageous at times, particularly in view of the fact that the activator is readily recovered for re-use from the reaction mixture. Concentrations up to about 50% to 75% by weight of the fatty acid solvent may be advisable in the presence of appreciable amounts of materials, such as saturated liquid hydrocarbons or ethyl benzene, which tend to slow down the desired oxidation reaction or when the starting methyl aromatic compound contains nuclear substituents which exert a similar effect.

In addition, it has been found essential for rapid and efficient oxidation to provide a minor proportion of water in the oxidation mixture. The preferred water content of the reaction mixture is in the range of 1% to about 9% by weight of the reaction mixture and best results are obtained in the preferred range of 3% to 7% of water by weight of the reaction mixture. Also, the sum of the concentrations of water and activator should be at least 4% to avoid a significant slowing down of the oxidation reaction. The oxidation reaction is continued until 30–95% of the methyl aromatic compound has been oxidized to an aromatic carboxylic acid product. The resulting oxidation mixture is a slurry. The products coming from the oxidation reactor are then separated from unreacted oxygen.

The resulting crude aromatic carboxylic acid may then be readily and expeditiously purified by simply heating the crude at a temperature between 225–260° C. and at least autogenous pressure for at least 10 minutes, crystallizing the purified acid by cooling below 170° C. and recovering the acid product. Autogenous pressure or higher may be conveniently employed, with the upper pressure limit not being especially critical. Generally it is preferred to operate at a pressure of from autogenous to 200 p.s.i.g. above autogenous since no particular advantage is seen in operating higher than this.

The procedure of the present invention offers numerous distinct advantages over the procedures heretofore employe. For example, p-toluic acid, terephthalaldehydic acid and residual catalyst cannot be washed out of the crude aromatic carboxylic acid oxidation product in the normal fashion. The aromatic carboxylic acid may be purified by dissolving in known recrystallization solvents and recrystallizing the acid product therefrom; however, large amounts of solvent are used due to the very low solubility. In addition, in normal recrystallization procedures fresh solvent must be used each time. In accordance with the present invention and contrary to normal procedure the aromatic carboxylic product can be markedly purified by merely crystallizing from the reaction liquors in accordance with the foregoing procedure. This results in a significant economic saving since the acid product does not have to be filtered and redissolved in fresh solvent. In accordance with the present procedure the purity may, for example, be increased from 90–95% to 98–100%. This is especially significant in view of the fact that when a crude product with such high purity as 90–95% is employed, further purification is especially difficult.

If ultra-pure acid product is desired the product recovered from the process of the present invention may be still further purified by recrystallization from known recrystallization solvents, such as lower fatty acids, for example, acetic acid and propionic acid, lower fatty acid amides, for example, N,N-dimethylformamide and N,N-dimethylacetamide, dioxane, water, and mixtures of any of the foregoing in water. In accordance with this process the crystallized product of the present invention is dissolved in the recrystallization solvent, heated to a temperature of at least 50° C., the purified acid product crystallized by cooling the mixture to a temperature below 40° C. and the purified aromatic carboxylic acid product recovered.

In accordance with the process of the present invention, the purified product may be recovered by known procedures, for example, filtering the product from the reaction mixture. In addition, the process of the present invention may be run batch or continuous.

The process of the present invention will be more readily apparent from a consideration of the following illustrative examples.

*Example I.—Oxidation of xylene*

A solution containing 314 parts by weight of glacial acetic acid, 42.2 parts by weight of para-xylene, 21.6 parts of methyl ethyl ketone, and 7.5 parts by weight of cobalt acetate tetrahydrate, the solution having a water content of 4% by weight, was charged into a stainless steel pressure reactor equipped with a temperature controller, stirrer and suitable inlet for the introduction of oxygen or air. The stirring and heating were started and oxygen gas introduced to 300 p.s.i.g. As soon as the temperature reached 130° C. the oxygen pressure was increased to 500 p.s.i.g. Vigorous oxygen absorption started, acompanied by considerable evolution of heat, the oxygen pressure being maintained constant by means of suitable control valve and the temperature being kept at 130° C. by cooling the reaction vessel. After the reaction had proceeded under these conditions for the desired period (until about 30–95% of the methyl aromatic compound had been oxidized to an aromatic carboxylic acid product) the reaction was stopped by rapid cooling of the vessel and contents and release of the oxygen pressure.

*Example II.—Purification*

A portion of the slurry from the oxidation run in Example I above was recharged to an autoclave after removal of dissolved gases and heated to 230 to 245° C. under autogenous pressure for 60 minutes. After the 60 minute period, the mixture was cooled to a temperature of 45° C. and discharged. Solid terephthalic acid crystallized from the mixture, was filtered, washed with glacial acetic acid, followed by water and dried. The neutral equivalent was 83.0% equal to 100% purity. Solids similarly isolated from another portion of the original slurry, but without the purification procedure of the present invention, had neutral equivalent of 84.3% equal to 96.1% purity.

*Example III.—Purification*

A portion of the slurry from another oxidation run performed in a manner after Example I was charged to an autoclave after removal of dissolved gases, heated to a temperature of 228–233° C. under autogenous pressure for about 30 minutes. After the 30 minute period the purified terephthalic acid was recovered as in Example II. Analysis showed the purified material to contain 99.5% terephthalic acid, 0.2% p-toluic acid and 0.2% terephthalaldehydic acid. The solids isolated from the starting slurry were found to contain 93.6% terephthalic acid, 4.3% p-toluic acid and 2.0% terephthalaldehydic acid.

*Example IV.—Purification*

A continuous recrystallization run was conducted using as feed the degassed slurry from an oxidation run in a manner after Example I. In this recrystallization, the retention time was 14 minutes in a heated coil at a temperature of 235 to 245° C., under a pressure of 350 p.s.i.g. The isolated purified product analyzed 98.9% terephthalic acid, and 1.15% p-toluic acid. A sample of solids isolated from the feed slurry analyzed 96.0% terephthalic acid and 4.0% p-toluic acid.

This invention may be embodied in other forms or carried out in other ways without departing from the spirit or essential characteristics thereof. The present embodiment is therefore to be considered as in all respects illustrative and not restrictive, the scope of the invention being indicated by the appended claims, and all changes which come within the meaning and range of equivalency are intended to be embraced therein.

What is claimed is:

1. A process for purifying the benzene dicarboxylic acid prepared by the oxidation of a reaction mixture comprising a dilute solution of a methyl benzene compound in a lower fatty acid having 2–4 carbon atoms containing minor portions of water, a methylenic ketone and a cobalt salt of a 2–4 carbon atom containing lower fatty acid which comprises heating the said benzene dicarboxylic acid together with the reaction mixture in which it was prepared at a temperature of 225–260° C. for at least ten minutes and at least autogenous pressure, crystallizing the thus purified benzene dicarboxylic acid by cooling below 170° C. and recovering the said purified terephthalic acid.

2. A process for purifying the terephthalic acid prepared by the oxidation of a reaction mixture comprising a dilute solution of p-xylene in a lower fatty acid having 2-4 carbon atoms containing minor portions of water, a methylenic ketone and a cobalt salt of a 2-4 carbon atom containing lower fatty acid which comprises heating the said terephthalic acid together with the reaction mixture in which it was prepared at a temperature of 225-260° C. for at least ten minutes and at least autogenous pressure, crystallizing the thus purified terephthalic acid by cooling below 170° C. and recovering the said purified terephthalic acid.

3. A process according to claim 2 wherein the terephthalic acid is further purified by washing with acetic acid followed by water and drying.

References Cited in the file of this patent

UNITED STATES PATENTS

| | | |
|---|---|---|
| 2,838,565 | Heath et al. | June 10, 1958 |
| 2,853,514 | Brill | Sept. 23, 1958 |

FOREIGN PATENTS

| | | |
|---|---|---|
| 738,801 | Great Britain | Oct. 19, 1955 |
| 781,736 | Great Britain | Aug. 28, 1957 |
| 785,051 | Great Britain | Oct. 23, 1957 |
| 816,892 | Great Britain | July 22, 1959 |